J. A. McKAY.
ELECTRIC FITTING CONNECTION.
APPLICATION FILED OCT. 19, 1917.

1,307,869.

Patented June 24, 1919.

Inventor.
J. A. McKay
by
H. S. Dennison
atty.

UNITED STATES PATENT OFFICE.

JOHN A. McKAY, OF TORONTO, ONTARIO, CANADA.

ELECTRIC-FITTING CONNECTION.

1,307,869. Specification of Letters Patent. Patented June 24, 1919.

Application filed October 19, 1917. Serial No. 197,455.

*To all whom it may concern:*

Be it known that I, JOHN ANDREW MCKAY, a subject of the King of Great Britain, and resident of the city of Toronto, county of York, Province of Ontario, in the Dominion of Canada, have invented certain new and useful Improvements in Electrical-Fitting Connections, as described in the following specification and illustrated in the accompanying drawings, that form part of the same.

The principal objects of this invention are, to devise a means for securing electric fittings in place which will effectively insulate the fitting from the wall structure and will enable the fitting being placed in position with the minimum of difficulty and labor and will insure the fitting being held securely and snugly in place.

A further and important object is to devise a structure which will allow of the wiring of the permanent structure and the removable fitting so that the joining of the wires in placing the fitting may be eliminated, thereby enabling fixtures to be placed or removed at will without interfering with the wiring in any manner.

The principal feature of the invention consists in the novel construction of a permanent support for the fitting having an angularly disposed socket and in the arrangement of a pivotal member secured to the fitting, whereby said pivotal member when inserted into the socket will draw the fitting snugly into place.

In the drawings, Figure 1 is a vertical sectional view showing my improved form of fitting assembled.

Figure 1:
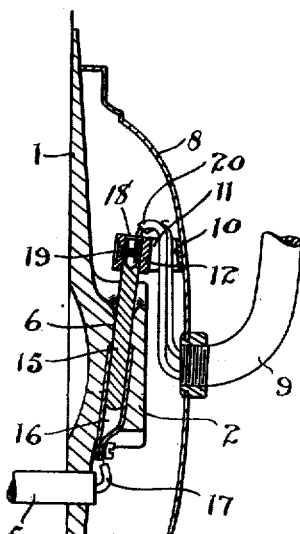

It is very well known to those experienced in the manufacture, use and sale of electric fittings that it is extremely difficult to insure the thorough insulation of the fitting member in place where metal laths are used.

To accomplish the thorough insulation of the fitting I provide a base or back plate 1 which is formed of a suitable insulating material preferably tapering in thickness from the center outwardly to the edges and having formed in the center thereof a raised boss 2. This base is secured to the wall by means of screws or bolts or the like being inserted through the holes 3 and the outer contour of the edge of the base is shaped to suit the particular fitting which is to be placed thereon.

Openings 4 are provided preferably at the lower side of the boss 2 through which the electric wires and insulating loom 5 are passed. The boss is formed with one or more socket holes 6 which extend transversely of the boss and preferably slope inwardly and downwardly.

Figure 2:
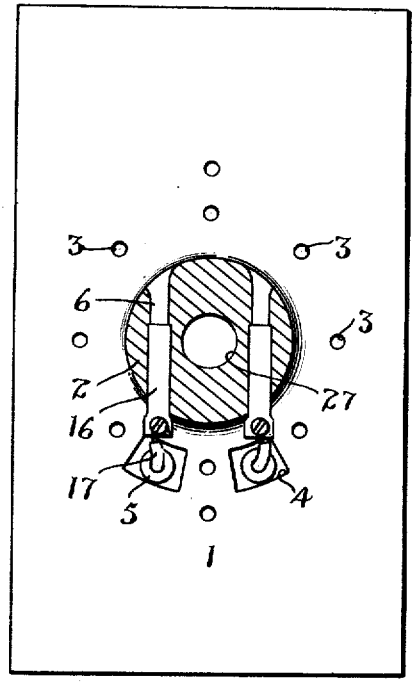
Fig. 2 is a plan view of the insulator plate showing the socket portion in transverse section.

In Figs. 1 and 2 a pair of socket holes are arranged equidistant from the center, the outer ends thereof being flared outwardly. The canopy 8 of the electric fitting 9 is usually of sheet metal stamped to any desirable pattern and its outer edge is adapted to rest upon the flat portion of the base 1.

Secured to the inner side of the fitting 9 is a bracket 10 provided with the inwardly extending lugs 11 and between these lugs is pivotally supported a block 12 of insulating material, pivot pins 13 extending from the ends through the holes 14 in the lugs 11.

15 are pins rigidly secured in the block 12 adapted to fit into the socket holes 6. It will be seen that the block 12 may be swung upon its pivot in the bracket 10 and the pins will project well out from the canopy so that the ends may be easily inserted into the flaring ends of the socket holes 6. The canopy is then pushed inwardly toward the base, the pins being forced into the socket holes and as the socket holes are arranged in a sloping position the downward pressure upon the canopy will cause the pins to draw inwardly and thus pull the canopy snugly into position against the base. A pair of fastening pins are here shown but it will be understood that one pin can be used if desired in simple forms of brackets.

It is extremely desirable to utilize the fastening pins as electrical connections though such use is not essential to the fastening of the bracket but in order to accomplish this result I provide tubular metallic sockets 16 arranged in the socket holes 6 to which the ends of the electrical feed wires 17 are secured.

The pins 15 are preferably counter-bored at the top to form the sockets 18 and the pins are secured in place by the counter-sunk screws 19. These screws extend into the sockets and secure the ends of the wires 20 of the fitting. This arrangement allows for the fitting being wired entirely independent of the connection to the feed wires and in order to place the brackets no connecting of wires by joining and soldering is required. The fastening pins are inserted into their sockets in the base and pushed home simultaneously securing the fitting in place and establishing the electrical connection between the feed wires and the wires of the fitting through the pins 15 and socket tubes 16. Such a construction will eliminate the difficulties met with in connecting fittings a second time and insures proper electrical contact with perfect insulation.

Figure 4:
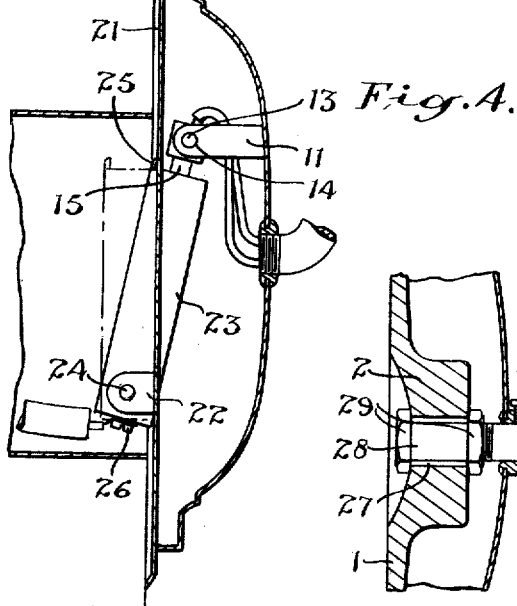
Fig. 4 is a vertical sectional view showing a modification of the device.
Figure 3:
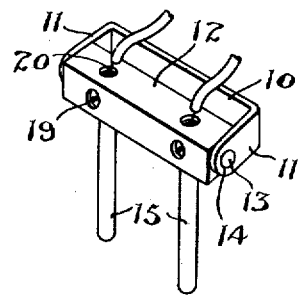
Fig. 3 is a perspective detail of the pivotal connector member for the detachable fitting.

In the modification shown in Fig. 4 the face plate 21 which may be of insulating material is formed with an opening in the face at each side of which is arranged a lug 22 adjacent to the bottom.

23 is a block of insulating material pivotally supported by the pins 24 in the lugs 22. The block 23 is provided with socket holes to receive the pins 15 in a manner precisely similar to the socket holes 6, said block being adapted to be swung forwardly through the opening in the face plate to an angular position as shown in full lines. A lug 25 is arranged on the back of the block 23 to engage the back side of the face plate to limit the outward movement of the block. This block may be provided with electrical connections similar to the tube 16 and the feed wires may be connected to the binding screws 26 at the bottom or it may be used simply as a fixture holder with separate wiring connections if desired.

When the fixture is removed the block 23 may be swung upon its pivots into the recess in the wall and the face plate thus presents a finished appearance which will not be at all unsightly if it is not used for the attachment of a fixture and the electrical connections will be kept free from injury but always ready for use if it is desired to attach a bracket.

Figure 5:
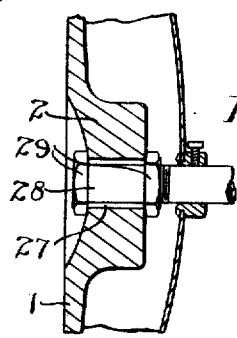
Fig. 5 is a sectional detail showing the adaptability of the fitting for use in ordinary fixed types of fittings.

The base 1 is preferably formed with a central hole 27 through the boss 2 in order that ordinary fittings may be secured thereto if desired by passing the stem 28 of the fitting through the holder and secure it with the lock nuts 29 as illustrated in Fig. 5.

The many advantages to be obtained by the adoption of an electric fitting connection such as herein described will be readily apparent and the dangers incident to the uncontrolled interference with electric wiring by unskilled persons will be entirely obviated and danger from fire thus avoided.

What I claim as my invention is:—

1. An electrical fitting connection, comprising a fixture having an inclined socket, a fitting having a hollow canopy adapted to cover said fixture, and a member having one end pivotally secured within the hollow canopy adapted to enter said socket and draw the canopy into close engagement with the wall surface.

2. An electrical fitting connection comprising a fixture having an insulated inclined socket, an insulated member pivotally supported from the fitting and having a pin adapted to be inserted into said inclined socket.

3. An electrical fitting connection comprising a fixture having an inclined socket hole, a bracket secured to the fitting, a block of insulating material pivotally supported in said bracket, and a pin secured in said block and adapted to be inserted into said socket.

4. An electrical fitting connection comprising a fixture having a pair of inclined sockets, electrical contacts arranged in said sockets and adapted to be connected with the feed wires, a pivotal insulated member secured to the fitting, a pair of metallic pins secured in said insulated member and adapted to enter said sockets and electrically connected to the wires of the fitting.

5. An electrical fitting connection comprising a base, a block of insulating material pivotally mounted in said base and having socket holes therein, a block pivotally mounted in the fitting, and pins secured in said fitting block adapted to enter the sockets in said pivotal block.

J. A. McKAY.

Copies of this patent may be obtained for five cents each, by addressing the "Commissioner of Patents, Washington, D. C."